(12) United States Patent  
Shiomi et al.

(10) Patent No.: US 6,284,411 B1
(45) Date of Patent: Sep. 4, 2001

(54) VALVE REGULATED TYPE BATTERY AND PRODUCING METHOD THEREOF

(75) Inventors: Masaaki Shiomi; Yuuichi Okada; Akiyoshi Kimura; Masaji Adachi; Ken Sawai, all of Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 08/943,011

(22) Filed: Oct. 2, 1997

(30) Foreign Application Priority Data

| Oct. 2, 1996 | (JP) | 8-281901 |
| Oct. 2, 1996 | (JP) | 8-281903 |
| Oct. 3, 1996 | (JP) | 8-282982 |
| Oct. 3, 1996 | (JP) | 8-282983 |

(51) Int. Cl.[7] .............. H01M 4/64; H01M 4/68; H01M 4/73; H01M 4/74
(52) U.S. Cl. ............... 429/233; 429/218.1; 429/245
(58) Field of Search .................. 429/233, 218.1, 429/245

(56) References Cited

U.S. PATENT DOCUMENTS

| 3,723,182 | 3/1973 | Venuto . | |
| 3,933,524 | * 1/1976 | Hughel et al. . | |
| 4,107,407 | * 8/1978 | Koch | 429/225 |
| 4,315,977 | * 2/1982 | Ruetschi | 429/233 |
| 4,906,540 | * 3/1990 | Hoshihara et al. | 429/242 |
| 5,227,260 | * 7/1993 | Rose et al. | 429/54 |
| 5,352,549 | * 10/1994 | Rao et al. | 429/228 |
| 5,395,488 | * 3/1995 | Scharbert et al. | 204/73 R |
| 5,401,278 | * 3/1995 | Yasuda et al. | 29/2 |
| 5,411,821 | * 5/1995 | Feldstein | 429/226 |
| 5,434,025 | * 7/1995 | Rao et al. | 429/245 |
| 5,650,242 | * 7/1997 | Rao et al. | 429/161 |
| 5,820,639 | * 10/1998 | Synder et al. | 29/623.5 |

FOREIGN PATENT DOCUMENTS

| 0 443 451 A1 | 8/1991 | (EP) . | |
| 54-114729 | 9/1979 | (JP) | H01M/10/08 |
| 56-82748 | 7/1981 | (JP) | B65H/5/38 |
| 58-209865 | 12/1983 | (JP) | H01M/4/82 |
| 61-126551 | 6/1986 | (JP) | G03F/1/00 |
| 61-142666 | 6/1986 | (JP) | H01M/4/20 |
| 1-200558 | 8/1989 | (JP) | H01M/4/57 |
| 3-276561 | 12/1991 | (JP) | H01M/4/14 |

OTHER PUBLICATIONS

Patent Abstracts of Japan, vol. 015, No. 405, Publication No., 03165464, Date Jul. 17, 1991.

* cited by examiner

*Primary Examiner*—Gabrielle Brouillette
*Assistant Examiner*—Tracy Dove
(74) *Attorney, Agent, or Firm*—Sughrue, Mion, Zinn, Macpeak & Seas, PLLC

(57) ABSTRACT

In a valve regulated type lead-acid battery, a positive plate includes a positive grid made of Pb—Ca alloy and a positive active material containing Sb in the range of 0.005% to 1.0% both inclusive per weight of the positive active material; wherein a density of the positive active material is not lower than 3.75 g/cc after formation.

8 Claims, 6 Drawing Sheets

VALVE REGULATED TYPE BATTERY AND PRODUCING METHOD THEREOF

BACKGROUND OF THE INVENTION

1. Field of the Invention

The present invention relates to an improvement in endurance performance of a valve regulated type lead-acid battery using a Pb—Ca type alloy as a positive electrode grid.

2. Description of the Related Art

There are some types of valve regulated type storage batteries which are a starved type battery with a fine glass mat separator abutting on positive and negative plates and being currently most widely used; a gel type battery having an electrolyte gelled with colloidal silica which has been used from long ago in Europe and its vicinity; and a recently developed granular silica type battery in which granular silica is filled between and in the surroundings of the electrode plates, and the silica is impregnated with an electrolyte.

It is known that a Pb—Ca type alloy grid is used in these valve regulated type batteries as a positive electrode and, accordingly, the cycle life of these batteries is considerably shorter than that of conventional flood type batteries using an Sb alloy grid as a positive electrode. One of the causes of this is the deteriorate (softening) of the positive active material.

In order to solve the above problem, the following countermeasures in which a fine amount of antimony is added to the positive active material have been known.

(1) Unexamined Japanese Patent Publication (kokai) No. Sho-54-114729 discloses to add 0.05% or less of $Sb_2O_3$ to a positive active material.

(2) Unexamined Japanese Patent Publication (kokai) No. Sho-56-82748 discloses that a positive plate uses lead powder produced from lead alloy containing Sb in the range of from 0.05% to 0.5%.

(3) Unexamined Japanese Patent Publication (kokai) No. Sho-58-209865 discloses to immerse a positive plate in an $Sb_2O_3$ solution or blow $Sb_2O_3$ to a positive plate.

(4) Unexamined Japanese Patent Publication (kokai) No. Sho-61-142666 disclose to add $Sb_2O_3$ to a positive active material of a battery using a calcium grid.

(5) Unexamined Japanese Patent Publication (kokai) No. Sho-61-126551 discloses to add $Sb_2O_3$ to a positive active material of a battery using a low Sb grid.

(6) Unexamined Japanese Patent Publication (kokai) No. Hei-1-200558 discloses to add antimony powder and silica powder in a range of from 0.05% to 0.5% to a positive active material of a valve regulated type battery.

(7) Unexamined Japanese Patent Publication (kokai) No. Hei-3-276561 discloses to add antimony or antimony oxide in a range of from 0.05% to 1%.

In spite of existence of such techniques, when the aforementioned antimony or antimony oxide is added actually, there are some cases where performance is improved and some cases where endurance is worsened instead of improved. As a result of examination of the cause for this, it was found that, in a battery having a capacity lowered in an early stage, antimony was precipitated on a negative plate to lower the charging efficiency and a large amount of sulfuric acid was accumulated. Further, when the result of the examination was studied statistically, the above phenomenon was observed mostly in a positive plate which was low in density of the active material. Further, as a result of various experiments, it was found that when antimony and arsenic were added at the same time, more remarkable improvement of endurance performance could be achieved by addition of antimony by a relatively small amount to an extent that the antimony had no influence on a negative plate. It was further found that not only addition of antimony to the paste but also the state as to whether the dispersion of antimony in the active material was well or not was a key point. It was further found that this phenomenon occurred frequently when a general container formation method (a method in which plate formation is performed in a state in which electrode plates are disposed in a battery container), which is a general method for formation of a lead-acid battery at present, was used, and that this phenomenon occurred when the leaving time from electrolyte filling to start of formation was long. Because this container formation method is indispensable for cost reduction of the battery, it is essential to perform an improvement with this method as a premise.

SUMMARY OF THE INVENTION

It is an object of the present invention to prevent the deterioration of a positive active material so as to improve and stabilize the endurance of a valve regulated type lead-acid battery.

A valve regulated type lead-acid battery according to the present invention comprises a positive electrode including a positive grid comprising Pb—Ca alloy and a positive active material containing Sb in the range of 0.005% to 1.0% both inclusive per weight of the positive active material; wherein a density of the positive active material is not lower than 3.75 g/cc after formation.

DETAILED DESCRIPTION OF THE INVENTION

Figure 1:
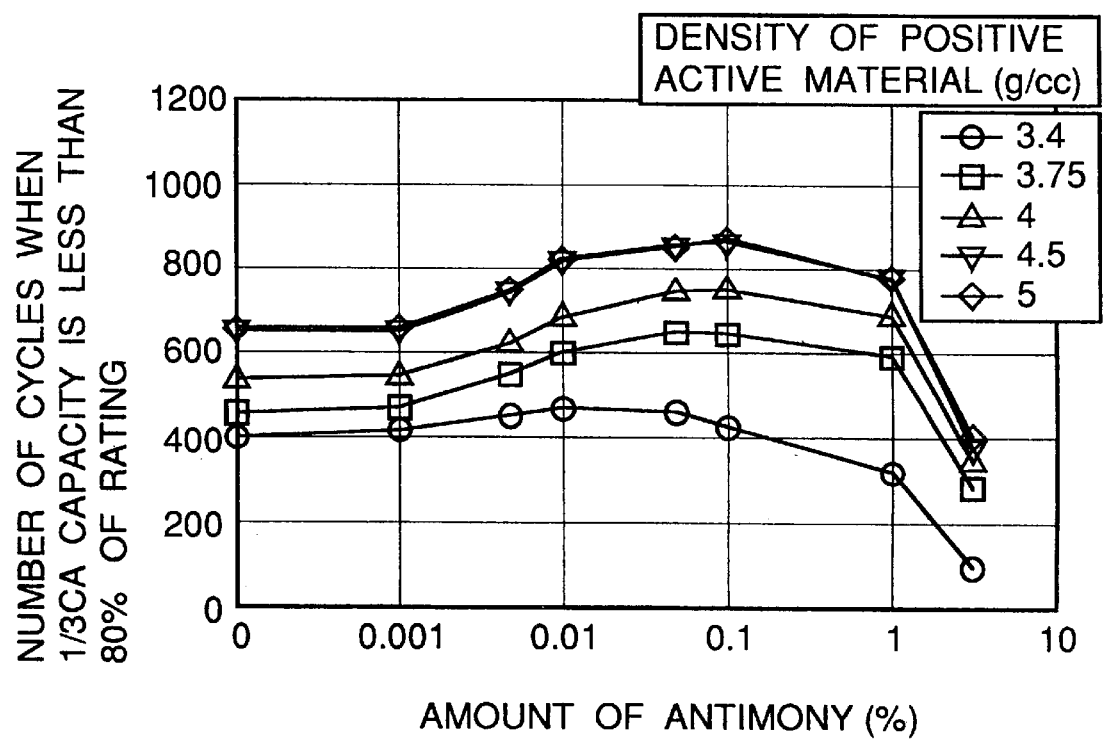
FIG. 1 is a characteristic graph showing the relations among the amount of antimony added, the density of a positive active material and the endurance performance.

Detailed description of the present invention will be described as follows.

Antimony is added to a positive active material of a valve regulated type lead-acid battery using a Pb—Ca type alloy as a positive electrode grid so that 0.005 to 1.0% by weight of antimony is present in the positive active material, and the positive active material is provided to make its density not lower than 3.75 g/cc after formation. In this occasion, arsenic is added together with antimony to the positive active material so that 0.005 to 0.1% by weight of arsenic is present in the positive active material. The effect of an addition method which uses lead powder produced from an alloy containing a predetermined amount of Sb and a predetermined amount of As is equivalent to that of a conventional addition method which uses lead powder produced from pure lead so that Sb and As are added to the lead powder while being mixed into paste. Further, Sb and As used at that time may be metals or chemical compounds such as oxides, sulfates or the like. Further, the lead powder may be produced by means of a ball mill or may be produced by a so-called BARTON method in which a predetermined lead alloy is melted to produce lead powder.

Further, the positive active material is produced so that antimony added thereto is present so as to be dispersed evenly in the positive active material. The addition method is carried out so that antimony sulfate, antimony trioxide or metal antimony finely pulverized and dispersed in dilute sulfuric acid or water in advance under application of an ultrasonic wave in a range of from 1 kHz to 100 kHz, is added to positive electrode paste when the paste is being mixed.

Further, the valve regulated type lead-acid battery having the above characteristic is produced by a container formation method so that the time from electrolyte filling to the start of container formation is not longer than 2 hours, most preferably not longer than 30 minutes.

EXAMPLES

Examples of the present invention will be described below.

Example 1

An antimony sulfate solution in which antimony sulfate was dissolved in dilute sulfuric acid of the specific gravity of 1.40 used for paste mixing was added to the active material by amounts of 0.001%, 0.005%, 0.01%, 0.05%, 0.1%, 1% and 3% per weight of the active material to thereby prepare paste. A grid formed of a Pb alloy containing 0.1% of Ca and 1.5% of Sn was filled with the thus prepared paste so that a positive plate with a thickness of 2.4 mm was produced. That is, in this occasion, the aforementioned seven amounts of antimony were added to five kinds of pastes different in active material density (active material density: 3.4, 3.75. 4.0, 4.5 and 5.0 g/cc after formation) so that 35 kinds, in total, of positive plates were produced.

About 63 Ah (3 hR)–12 V starved type valve regulated type batteries were produced by an ordinary producing method such that each of the batteries was constituted by ten positive plates thus prepared, eleven 1.7 mm-thick paste type negative plates, and a fine glass mat separator.

Incidentally, batteries using conventional standard electrode plates without addition of any antimony sulfate were also produced. After these batteries were subjected to predetermined electrolyte filling by an ordinary method, container formation was carried out to complete these batteries. After measuring 1/3 CA discharge initial capacity, an endurance test was carried out. The endurance test was performed at 40° C. in the general condition in which each battery was discharged by 80% of the rating with a current of 1/3 CA and then charged with a constant current of 1/5 CA and then with a constant voltage of 2.4 V.

Figure 2:
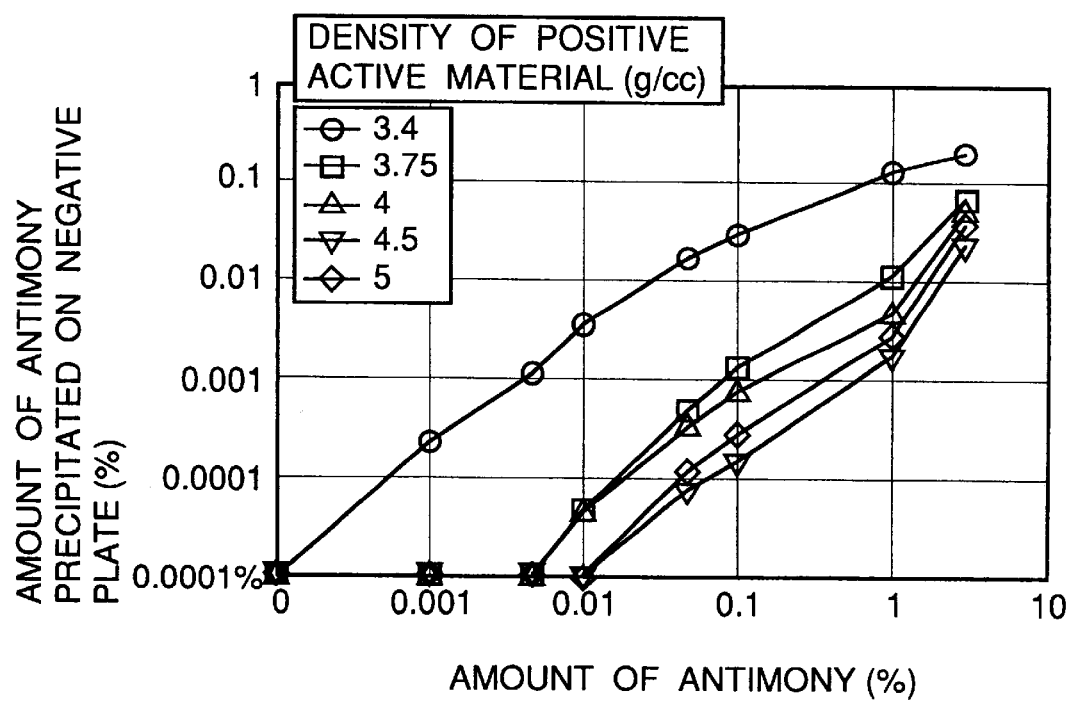
FIG. 2 is a characteristic graph showing the relations among the amount of antimony added, the density of a positive active material, and the amount of antimony precipitated on negative plates.

First, the initial capacity was proportional to the active material density but there was no difference due to the amount of Sb added. The endurance performance, the results of which were shown in FIG. 1, was improved remarkably when the amount of Sb added was in a range of from 0.005% to 1%, particularly when the positive active material density was not lower than 3.75 g/cc. After container formation, other batteries with the same configuration were taken apart into pieces so that the amount of antimony precipitated on the negative plates was analyzed. As seen in the results shown in FIG. 2, the amount of antimony precipitated on the negative plates was large when positive plates having the active material density not higher than 3.75 g/cc were used.

It is apparent from the results that, when the positive active material density is too low, antimony added is eluted into the electrolyte and precipitated on the negative plates to thereby make the endurance performance worse instead. Because it is known that the positive active material $PbO_2$ has the ability of adsorbing antimony, the positive plates have active material density suitable to the amount of antimony added so that antimony added is kept in the positive plates.

Although this example shows the case where antimony sulfate was dispersed and added to sulfuric acid, there was no large difference in effect even in the case where antimony sulfate was added to water which was one of paste mixing liquids. Although this example shows the case where antimony sulfate was used as antimony, there was no large difference in results of the test even in the case where antimony metal or antimony trioxide was added in the same manner as described above.

Example 2

Pb—Sb—As alloys different in the amount of Sb and the amount of As were prepared. By using the alloys, lead powder was prepared by means of a ball mill. The amount of Sb was selected to form the seven values of 0.001%, 0.005%, 0.01%, 0.05%, 0.1%, 1% and 3% per weight of the positive active material and the amount of As was selected to form the six values of 0.001%, 0.005%, 0.01%, 0.05%, 0.1% and 1% per weight of the positive active material. These values were used in combination to prepare the alloys.

By using the lead powder produced from these alloys, paste was prepared so that the positive active material density was 3.75 g/cc after formation. A grid formed of a Pb alloy containing 0.1% of Ca and 1.5% of Sn was filled with the paste so that a positive plate with a thickness of 2.4 mm was produced. About 63 Ah (3 hR)–12 V starved type valve regulated type batteries were produced by an ordinary producing method such that each of the batteries was constituted by ten positive plates thus prepared, eleven 1.7 mm-thick paste type negative plates, and fine glass mat separators.

In addition, conventional standard batteries using positive plates formed by application of lead powder produced from an alloy having only As added or lead powder produced from pure lead were also produced. After these batteries were subjected to predetermined electrolyte filling and charged by an ordinary method, these batteries were discharged with a current of 1/3 CA to measure the initial capacity and then subjected to a endurance test. The endurance test was performed at 40° C. in the general condition in which each battery was discharged by 80% of the rating with a current of 1/3 CA and then charged with a constant voltage and a constant current of 1/5 CA and then with a constant voltage of 2.4 V.

Figure 3:
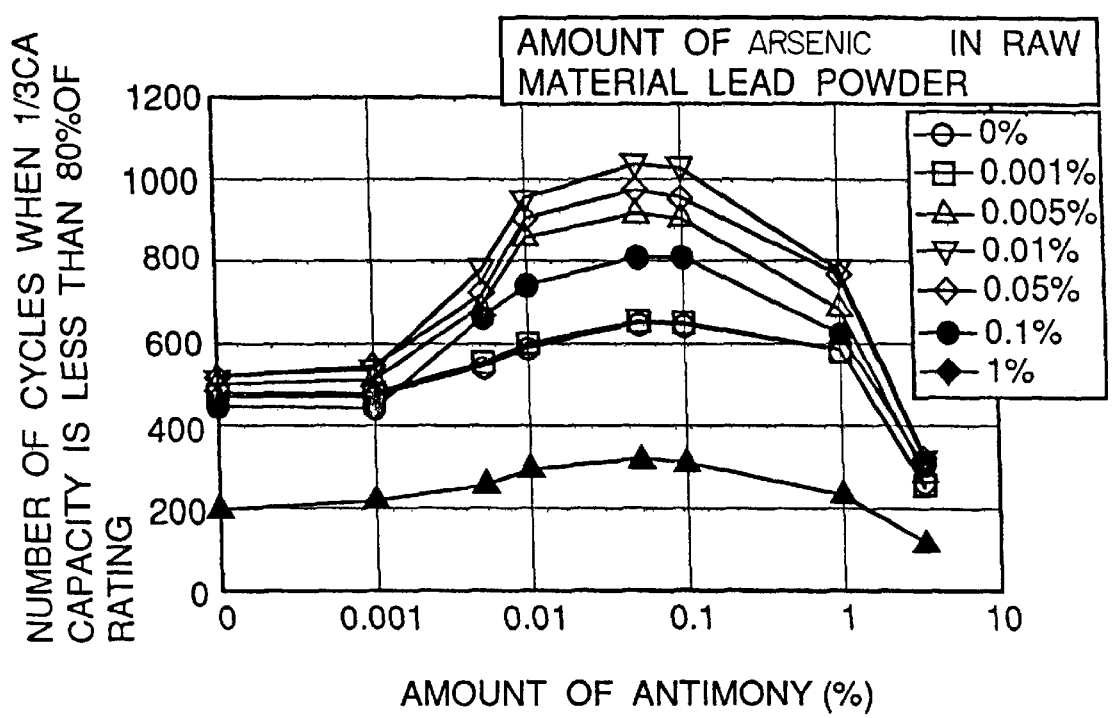
FIG. 3 is a characteristic graph showing the relations among the amount of antimony in positive electrode raw material lead powder, the amount of arsenic therein, and the endurance performance.

First, there was no large difference in the initial capacity regardless of the amount of Sb and the amount of As. As seen in the results shown in FIG. 3, the endurance performance was improved greatly when not only Sb but also As was added. Particularly when the element amount of Sb was in a range of from 0.005% to 1% and the element amount of As was in a range of from 0.005% to 0.1%, the endurance performance was the best.

Further, when only the amount of As was increased, the endurance performance was improved to a certain extent.

Although this example shows the case where lead powder produced from an alloy containing a predetermined amount of Sb and a predetermined amount of As, the same effect was obtained even in the case where conventional lead powder produced from pure lead was used and Sb and As were added at the time of mixing into paste. Further, Sb and As used at that time may be metals or chemical compounds such as oxides, sulfates, or the like.

Although this example shows the case where lead powder was produced by means of a ball mill, the same result was obtained even in the case of using lead powder produced in a so-called BARTON method in which a predetermined lead alloy was melted to produce lead powder.

Example 3

Antimony sulfate which was put into dilute sulfuric acid of the specific gravity of 1.40 used for paste mixing and which was pulverized and dispersed by means of an ultrasonic wave with frequencies of (1) 200 Hz, (2) 1 kHz, (3) 10 kHz, (4) 100 kHz and (5) 1 MHz, was added to the positive active material by amounts of 0.001%, 0.005%, 0.01%, 0.05%, 0.1%, 1% and 3% per weight of the latter to thereby prepare paste having the positive active material density of 3.75 g/cc after formation. A grid formed of a Pb alloy containing 0.1% of Ca and 1.5% of Sn was filled with the paste to thereby prepare a 2.4 mm-thick positive plate. About 63 Ah (3 hR)–12 V starved type valve regulated type batteries were produced by an ordinary producing method such that each of the batteries was constituted by ten positive plates thus prepared, eleven 1.7 mm-thick paste type negative plates, and fine glass mat separators. In addition, batteries using conventional standard positive plates without use of any antimony sulfate were also produced. After these batteries were subjected to predetermined electrolyte filling and charged by an ordinary method, these batteries were subjected to the following test.

After the ⅓ CA discharge capacity was first measured at 30° C., a endurance test was carried out. The endurance test was performed at 40° C. in the general condition in which each battery was discharged by 80% of the rating with a current of ⅓ CA and then charged by 110% of the discharge capacity with a constant current of 1/10 CA.

Figure 4:
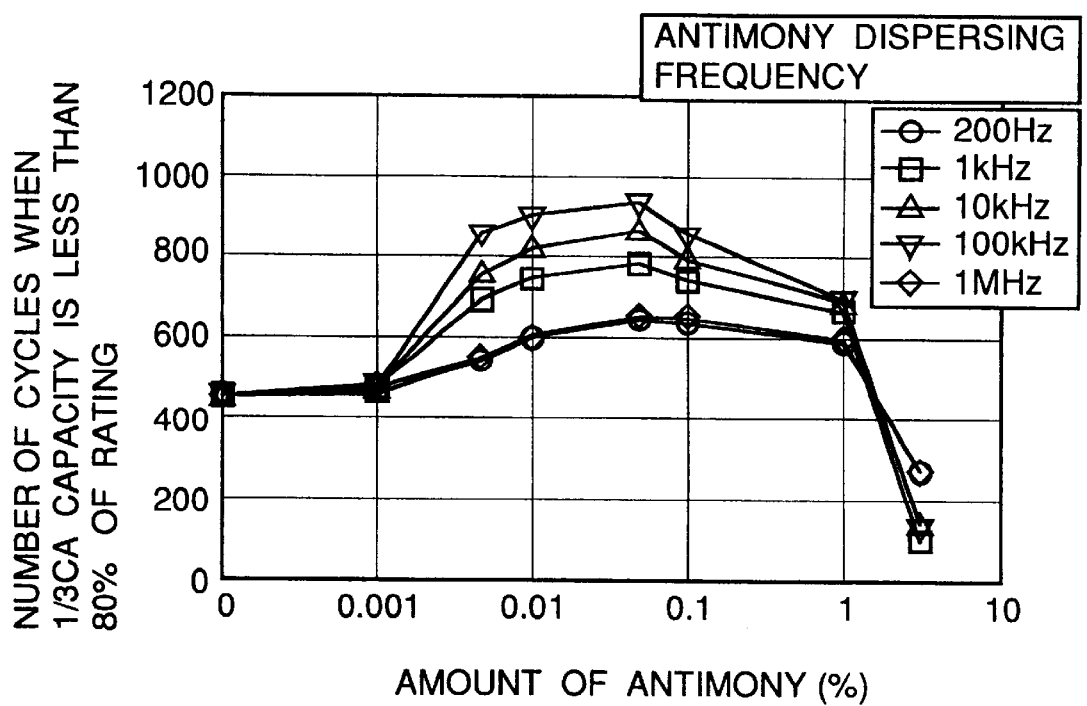
FIG. 4 is a characteristic graph showing the relations among the amount of antimony added, the frequency of an ultrasonic wave, and the endurance performance.

First, there was no large difference in the initial capacity regardless of the amount of Sb added and the method of dispersing Sb. Batteries using positive plates in which antimony sulfate pulverized and dispersed by means of an ultrasonic wave was added by an amount in a range of from 0.005% to 1% were excellent in the endurance performance, as seen in the results shown in FIG. 4. Among those results, batteries especially in the case where the frequency of the ultrasonic wave was in a range of from 1 kHz to 100 kHz were most effective.

Although this example shows the case where antimony sulfate was added and dispersed into sulfuric acid, there was no large difference in effect even in the case where antimony sulfate was added to water which was also one of paste mixing liquids. Although this example shows the case where antimony sulfate $Sb_2(SO_4)_3$ was used as antimony, there was no large difference in results of the test even in the case where antimony metal or antimony trioxide $Sb_2O_3$ was added in the same manner as described above.

Example 4

Antimony sulfate was put into dilute sulfuric acid of the specific gravity of 1.40 used for paste mixing and was pulverized and dispersed under application of an ultrasonic wave with a frequency of about 50 kHz. Then, this antimony sulfate solution was added to the positive active material by amounts of 0.001%, 0.005%, 0.01%, 0.05%, 0.1%, 1% and 3% per weight of the latter to thereby prepare paste having the positive active material density of 3.75 g/cc after formation. A grid formed of an Pb alloy containing 0.1% of Ca and 1.5% of Sn was filled with the thus prepared paste to thereby produce a 2.4 mm-thick positive plate. 63 Ah (3 hR)–12 V starved type valve regulated type batteries were produced by an ordinary producing method such that each of the batteries was constituted by ten positive plates thus produced, eleven 1.7 mm-thick paste type negative plates, and fine glass mat separators.

In addition, batteries using conventional standard electrode plates without addition of any antimony sulfate were also produced. 5 minutes, 30 minutes, 1 hour, 2 hours, 5 hours and 10 hours after these batteries were subjected to predetermined electrolyte filling by an ordinary method, container formation was performed with 7 A for 64 hours. After the ⅓ CA discharging capacity was then measured at 30° C., the endurance test was carried out. The endurance test was performed at 40° C. in the general condition in which each battery was discharged by 80% of the rating with a current of ⅓ CA and then charged with a constant voltage and a constant current of ⅕ CA and then with a constant voltage of 2.4 V.

Figure 5:
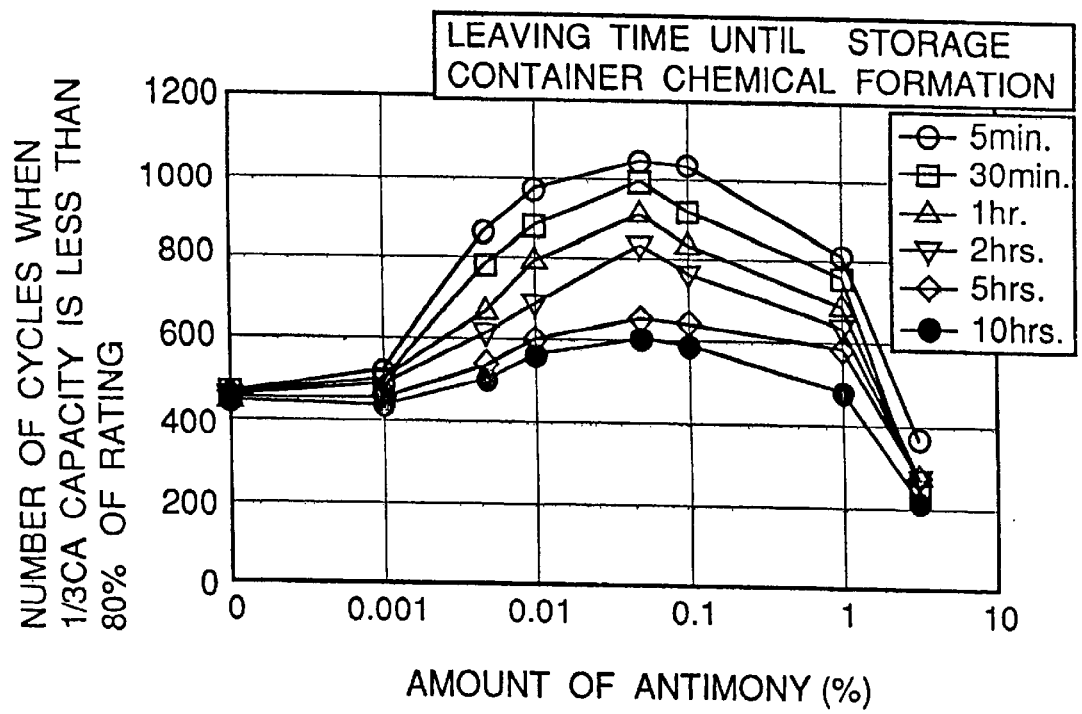
FIG. 5 is a characteristic graph showing the relations among the amount of antimony added, the leaving time up to container formation, and the endurance performance.
Figure 6:
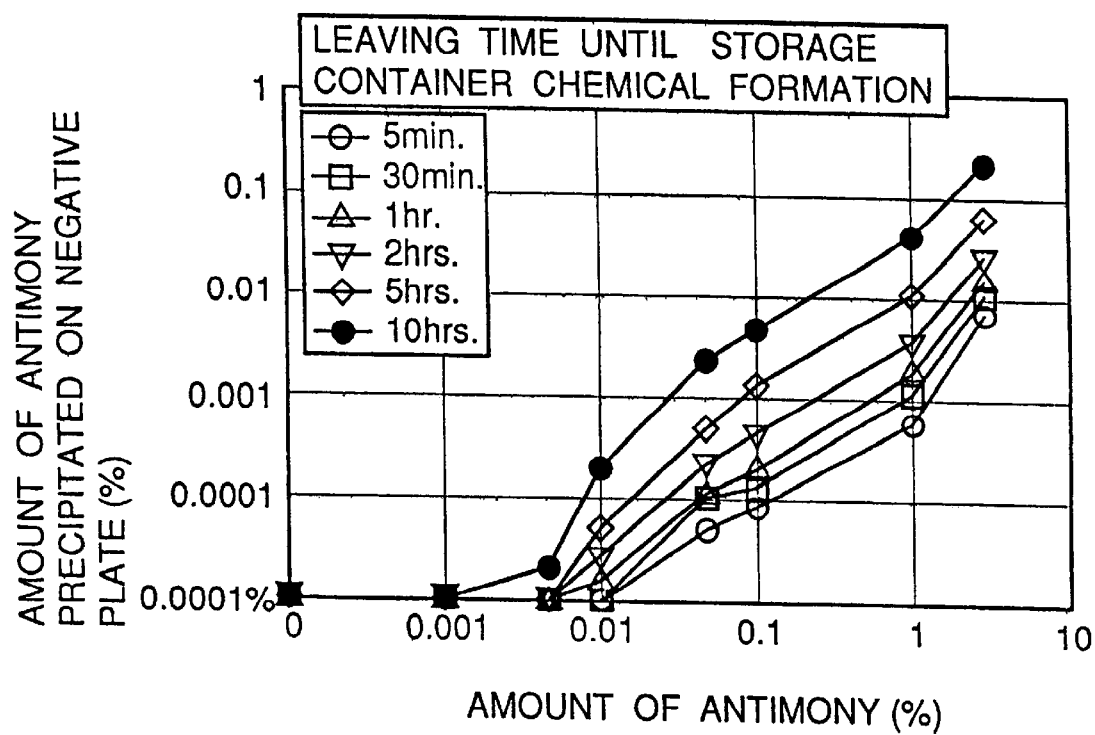
FIG. 6 is a characteristic graph showing the relations among the amount of antimony added, the leaving time up to container formation, and the amount of antimony precipitated on the negative plates.

First, there was no large difference in the initial capacity regardless of the amount of Sb added and the leaving time after electrolyte filling. Batteries shorter in the leaving time from the completion of electrolyte filling to the start of container formation were excellent in the endurance performance, as seen in the results shown in FIG. 5. Particularly, in the case where the amount of antimony added was in a range of from 0.005% to 1% and the leaving time was not longer than 2 hours, an remarkable effect was observed. Particularly in the case where the leaving time was not longer than 30 minutes, the most remarkable effect was observed. After container formation, batteries with the same configuration were taken apart into pieces and the amount of antimony precipitated on the negative plate was analyzed. Results of the analysis are shown in FIG. 6. Like the results of the endurance test, the amount of precipitated antimony was small when the amount of antimony was as described above and the leaving time was up to 2 hours. It was apparent from the results of this experiment that, when 0.01% or more of antimony was precipitated on the negative plates at the time of the completion of container formation, the antimony had a bad influence on the endurance performance.

Although the reason why the leaving time after electrolyte filling has a relation to the dissolution of antimony is not clear, it is considered that antimony has properties of adsorbing $PbO_2$ but hardly absorbing $PbSO_4$ and antimony reacts strongly with PbO in the electrode plates at the time of electrolyte filling before formation to generate an excessive large amount of lead sulfate in the ordinary charging/ discharging in the electrode plates to thereby bring a tendency that antimony is dissolved easily at the time of leaving as it is after electrolyte filling.

Besides, when container formation is started, antimony is further moved toward the positive grid because antimony is present as an anionic complex in the electrolyte. As a result, it is considered-that antimony is hardly dissolved any more at the time of container formation.

Although this example shows the case where antimony sulfate was dispersed and added into sulfuric acid, there was no large difference in effect even in the case where antimony sulfate was added to water which is one of paste mixing liquids. Although this embodiment shows the case where antimony sulfate was used as antimony, there was no large difference in results of the test also in the case where antimony metal or antimony trioxide were added in the same manner as described above.

As described above, 0.005 to 1% of antimony is added to a positive active material and the density of the positive active material is selected to be not lower than 3.75 g/cc. Accordingly, the endurance performance of a valve regulated type lead-acid battery is improved remarkably. Further, when 0.005 to 0.1% of arsenic is added, together with antimony, to the positive active material, the endurance performance is improved more remarkably. Further, a valve regulated type lead-acid battery using positive plates in which antimony or an antimony compound is added to the positive active material after the antimony or antimony compound is pulverized and dispersed in a liquid by means of an ultrasonic wave, or in which antimony or an antimony compound is added to the active material by starting container formation within 2 hours after electrolyte filling, can be put into practice. From this point of view, the industrial-value of the present invention is very large.

What is claimed is:

1. A valve-regulated type lead-acid battery comprising:
    a positive plate including a positive grid comprising Pb—Ca alloy and a positive active material comprising a Pb—Sb—As alloy powder, wherein said positive active material contains Sb in the range of 0.005 wt % to 0.1 wt % per weight of said positive active material, and wherein a density of said positive active material is not lower than 3.75 g/cc after formation.

2. The valve-regulated type lead-acid battery according to claim 1, wherein said positive active material further contains As in the range of 0.005 wt % to 0.1 wt % per weight of said positive active material.

3. A valve-regulated type lead-acid battery comprising:
    a positive plate including a positive grid comprising Pb—Ca alloy and a positive active material comprising a Pb—Sb—As alloy powder, wherein said positive active material contains As in the range of 0.005 wt % to 0.1 wt % per weight of said positive active material, and wherein a density of said positive active material is not lower than 3.75 g/cc after formation.

4. The valve-regulated type lead-acid battery according to claim 3, wherein said positive active material further contains Sb in the range of 0.005 wt % to 0.1 wt % per weight of said positive active material.

5. The valve-regulated type lead-acid battery according to claim 1, produced by the process comprising the steps of:
    injecting electrolyte into said battery; and
    subjecting a container formation;
    wherein the time from finish of injecting electrolyte to start of container formation is selected to be not longer than 2 hours.

6. The valve-regulated type lead-acid battery according to claim 2, produced by the process comprising the steps of:
    injecting electrolyte into said battery; and
    subjecting a container formation;
    wherein the time from finish of injecting electrolyte to start of container formation is selected to be not longer than 2 hours.

7. The valve-regulated type lead-acid battery according to claim 3, produced by the process comprising the steps of:
    injecting electrolyte into said battery; and
    subjecting a container formation;
    wherein the time from finish of injecting electrolyte to start of container formation is selected to be not longer than 2 hours.

8. The valve-regulated type lead-acid battery according to claim 4, produced by the process comprising the steps of:
    injecting electrolyte into said battery; and
    subjecting a container formation;
    wherein the time from finish of injecting electrolyte to start of container formation is selected to be not longer than 2 hours.

* * * * *